(12) United States Patent
Gray et al.

(10) Patent No.: US 10,689,887 B2
(45) Date of Patent: Jun. 23, 2020

(54) DOOR LATCH ASSEMBLIES FOR VEHICLES INCLUDING BELL CRANK BLOCKING STRUCTURES

(71) Applicant: Toyota Motor Engineering & Manufacturing North America, Inc., Erlanger, KY (US)

(72) Inventors: John K. Gray, Saline, MI (US); James D. Cunningham, Clarkston, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 180 days.

(21) Appl. No.: 15/867,088

(22) Filed: Jan. 10, 2018

(65) Prior Publication Data

US 2019/0211586 A1 Jul. 11, 2019

(51) Int. Cl.
| | | |
|---|---|---|
| *E06B 3/00* | (2006.01) | |
| *E05B 77/04* | (2014.01) | |
| *B60J 5/06* | (2006.01) | |
| *E05B 83/40* | (2014.01) | |
| *E05B 79/20* | (2014.01) | |
| *E05B 79/22* | (2014.01) | |

(52) U.S. Cl.
CPC ............... *E05B 77/04* (2013.01); *B60J 5/06* (2013.01); *E05B 79/20* (2013.01); *E05B 79/22* (2013.01); *E05B 83/40* (2013.01)

(58) Field of Classification Search
CPC .......... E05B 77/04; E05B 79/22; E05B 79/20; E05B 83/40; B60J 5/06

USPC ........................................................... 49/503
See application file for complete search history.

(56) References Cited

U.S. PATENT DOCUMENTS

| | | | | |
|---|---|---|---|---|
| 3,104,124 | A * | 9/1963 | Beck ...................... | E05B 77/54 292/280 |
| 3,990,531 | A * | 11/1976 | Register .................. | E05B 77/12 180/281 |
| 4,536,021 | A * | 8/1985 | Mochida ................. | E05B 77/12 292/201 |
| 5,492,379 | A * | 2/1996 | Staser ..................... | E05B 79/12 292/336.3 |

(Continued)

FOREIGN PATENT DOCUMENTS

| | | |
|---|---|---|
| DE | 102011051328 A1 | 12/2012 |
| EP | 3015629 A1 | 5/2016 |

(Continued)

*Primary Examiner* — Jerry E Redman
(74) *Attorney, Agent, or Firm* — Dinsmore & Shohl LLP (57) ABSTRACT

A vehicle door assembly includes an outer door panel and a door latch assembly operable to latch and unlatch the vehicle door assembly. The door latch assembly includes a door handle assembly, a bell crank operatively coupled to the door handle assembly, wherein rotation of the bell crank causes the door latch assembly to unlatch the vehicle door assembly, and a bell crank blocking structure. The bell crank blocking structure includes a first leg coupled to a support structure within the vehicle door assembly and an overhang portion connected to the first leg. The overhang portion extends outwardly from the first leg and is spaced from a plane of rotation of the bell crank during normal vehicle operating conditions. The overhang portion is configured to deform toward the plane of rotation of the bell crank during a side impact condition to block rotation of the bell crank.

20 Claims, 6 Drawing Sheets

(56) References Cited

U.S. PATENT DOCUMENTS

| | | | | |
|---|---|---|---|---|
| 5,769,471 A * | 6/1998 | Suzuki | | E05B 77/12 292/336.3 |
| 6,565,134 B1 | 5/2003 | Stuart et al. | | |
| 6,880,867 B2 * | 4/2005 | Schoen | | E05B 77/06 292/216 |
| 7,070,216 B2 | 7/2006 | von zur Muehlen | | |
| 8,485,570 B2 | 7/2013 | Konchan | | |
| 8,701,817 B2 * | 4/2014 | Schoen | | E05B 77/04 180/281 |
| 8,727,399 B2 * | 5/2014 | Russell | | E05B 77/04 292/216 |
| 9,045,917 B2 * | 6/2015 | Gschweng | | E05B 53/00 |
| 9,410,345 B2 * | 8/2016 | Uehara | | E05B 77/06 |
| 9,567,769 B2 * | 2/2017 | Zimmer | | E05B 77/04 |
| 9,677,303 B2 * | 6/2017 | Hirosawa | | E05B 79/12 |
| 10,024,083 B2 * | 7/2018 | Bejune | | E05B 77/06 |
| 2007/0069525 A1 * | 3/2007 | Ghannam | | E05B 77/04 292/216 |
| 2008/0185850 A1 * | 8/2008 | Takaya | | E05B 79/04 292/336.3 |
| 2008/0277947 A1 * | 11/2008 | Costigan | | E05B 79/12 292/336.3 |
| 2010/0109350 A1 * | 5/2010 | Gschweng | | E05B 17/0062 292/196 |
| 2011/0062747 A1 * | 3/2011 | Teramoto | | E05B 77/04 296/146.1 |
| 2011/0115251 A1 * | 5/2011 | Jordan | | E05B 77/02 296/146.1 |
| 2011/0115252 A1 * | 5/2011 | Higgins | | E05B 77/04 296/146.1 |
| 2011/0233944 A1 * | 9/2011 | Konchan | | E05B 77/06 292/216 |
| 2011/0258935 A1 * | 10/2011 | Heller | | B60J 5/0451 49/502 |
| 2012/0110920 A1 * | 5/2012 | Takagi | | E05B 77/06 49/503 |
| 2012/0119519 A1 * | 5/2012 | Sakai | | E05B 77/04 292/92 |
| 2014/0312630 A1 * | 10/2014 | Bendel | | E05B 77/06 292/195 |
| 2014/0346786 A1 * | 11/2014 | Takagi | | E05B 77/06 292/200 |
| 2018/0163437 A1 * | 6/2018 | Ishikawa | | E05B 77/12 |

FOREIGN PATENT DOCUMENTS

| | | |
|---|---|---|
| JP | 4990934 B2 | 8/2012 |
| JP | 5471921 B2 | 4/2014 |
| WO | 2014203930 A1 | 12/2014 |

* cited by examiner

DOOR LATCH ASSEMBLIES FOR VEHICLES INCLUDING BELL CRANK BLOCKING STRUCTURES

TECHNICAL FIELD

The present specification generally relates to door latch assemblies for vehicles and, more specifically, to door latch assemblies including bell crank blocking structures.

BACKGROUND

Door latch assemblies for vehicles may be provided and are used to latch a vehicle door, such as a driver side door or a passenger side door in a closed position. The door latch assemblies may include a door latch device within the vehicle door that can engage a cooperating structure, such as a striker that is located on a frame of the vehicle. The vehicle door may remain in the closed position until a vehicle occupant actuates a door handle, which then opens the door latch device.

For some side impact tests, vehicle door structures may move inboard, which may affect operation of the door latch assemblies. Accordingly, blocking structures that can block unintended actuation of the door latch assemblies under certain side impact conditions are desirable.

SUMMARY

In one embodiment, a vehicle includes a body and a vehicle door assembly movably coupled to the body. The vehicle door assembly includes an outer door panel and a door latch assembly positioned inboard of the outer door panel and operable to latch and unlatch the vehicle door assembly to the body. The door latch assembly includes a door handle assembly, a bell crank operatively coupled to the door handle assembly, wherein rotation of the bell crank causes the door latch assembly to unlatch the vehicle door assembly, and a bell crank blocking structure. The bell crank blocking structure includes a first leg coupled to a support structure within the vehicle door assembly and an overhang portion connected to the first leg. The overhang portion extends outwardly from the first leg so as to be spaced from a plane of rotation of the bell crank during normal vehicle operating conditions. The overhang portion is configured to deform toward the plane of rotation of the bell crank during a side impact condition to block rotation of the bell crank.

In another embodiment, a vehicle door assembly includes an outer door panel and a door latch assembly positioned inboard of the outer door panel and operable to latch and unlatch the vehicle door assembly. The door latch assembly includes a door handle assembly, a bell crank operatively coupled to the door handle assembly, wherein rotation of the bell crank causes the door latch assembly to unlatch the vehicle door assembly, and a bell crank blocking structure. The bell crank blocking structure includes a first leg coupled to a support structure within the vehicle door assembly and an overhang portion connected to the first leg. The overhang portion extends outwardly from the first leg so as to be spaced from a plane of rotation of the bell crank during normal vehicle operating conditions. The overhang portion is configured to deform toward the plane of rotation of the bell crank during a side impact condition to block rotation of the bell crank.

In yet another embodiment, a method of inhibiting movement of a door latch assembly of a vehicle from a latched configuration to an unlatched configuration is provided. The method includes connecting a first leg of a bell crank blocking structure to a support structure located within an interior of a vehicle door assembly. The vehicle door assembly includes an outer door panel and a door latch assembly positioned inboard of the outer door panel and operable to latch and unlatch the vehicle door assembly. The door latch assembly includes a door handle assembly and a bell crank operatively coupled to the door handle assembly, wherein rotation of the bell crank causes the door latch assembly to unlatch the vehicle door assembly. The bell crank blocking structure includes an overhang portion connected to the first leg and extending from the first leg. The method further includes locating the bell crank blocking structure so as to be spaced from a plane of rotation of the bell crank during normal vehicle operating conditions. The overhang portion is configured to deform toward the plane of rotation of the bell crank during a side impact condition to block rotation of the bell crank.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles including vehicle door assemblies that include door latch assemblies. The door latch assemblies are used to latch the vehicle door assemblies in a closed position. The door latch assemblies include a latch that may be located within the vehicle door assemblies. The latch can engage a cooperating structure, such as a striker, to hold the vehicle door assembly in the closed position until a vehicle door handle assembly is operated. The door handle assembly may be operatively connected to the latch using a bell crank. The bell crank may be part of the connection between the door handle assembly and the latch.

During certain side impact conditions, vehicle door structures within the vehicle door assemblies can move inboard and other directions. Movement of the vehicle door structures can include the bell crank. To inhibit unintended movement of the bell crank, a bell crank blocking structure is provided. The bell crank blocking structure is provided to move into a plane of rotation of the bell crank under side impact conditions where the bell crank blocking structure is moved due to an external force applied to the vehicle door assembly. The bell crank blocking structure is moved into the plane of rotation of the bell crank to prevent unintended movement of the bell crank that may affect operation of the latch.

Figure 1:
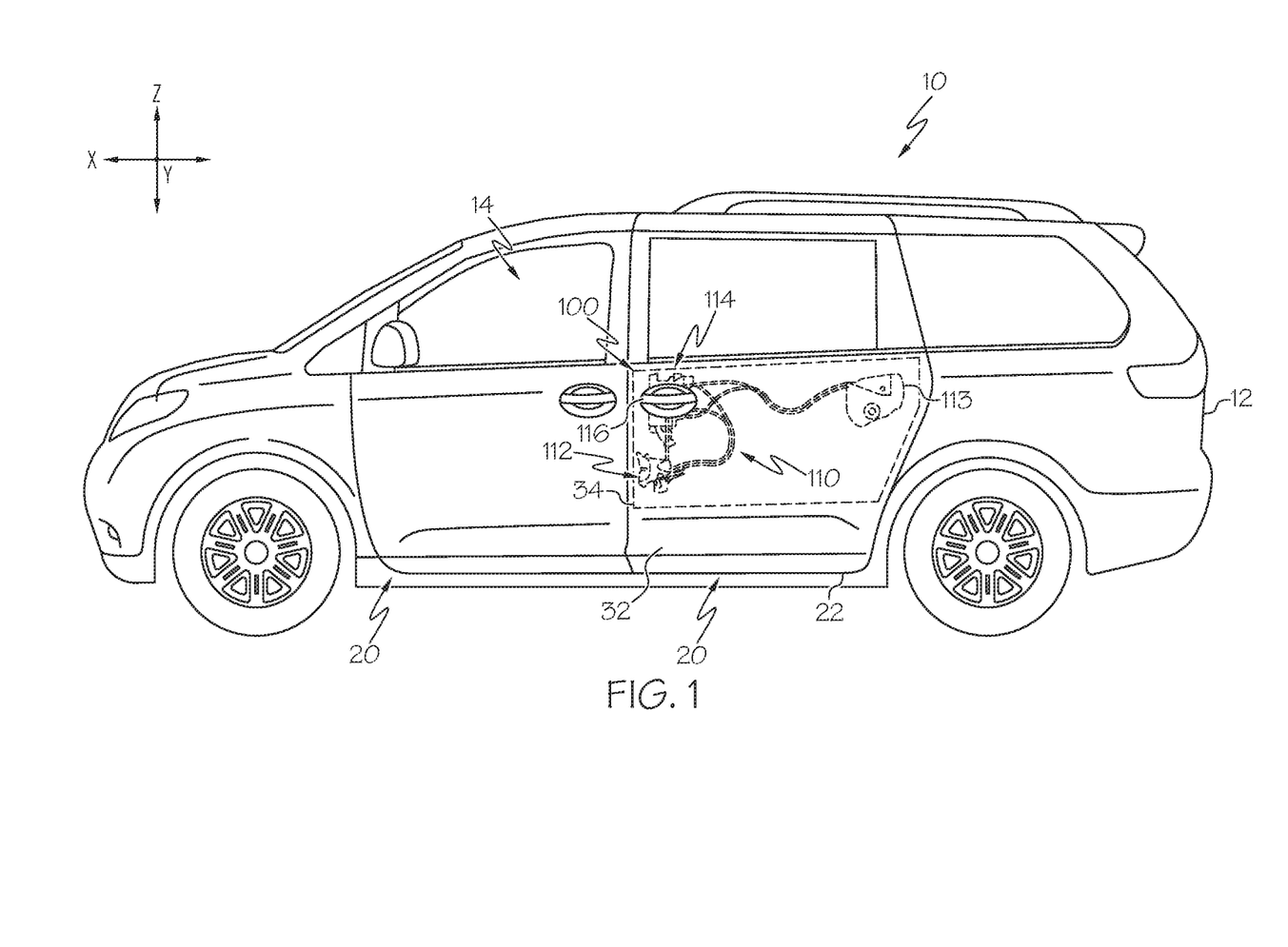
FIG. 1 depicts a side view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. The term "vehicle vertical direction" refers to the upward-downward direction of the vehicle 10 (i.e., in the +/− vehicle Z-direction as depicted). Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring now to FIG. 1, a vehicle 10 according to the various embodiments is illustrated. It is noted that while the vehicle 10 is depicted as a passenger van, the vehicle 10 may be any passenger vehicle such as, for example, a terrestrial, aquatic, and/or airborne vehicle. The vehicle 10 includes a body 12 characterizing a frame of the vehicle 10. The body 12 of the vehicle 10 defines an interior passenger compartment 14.

The vehicle 10 includes a number of door assemblies 20. The door assemblies 20 serve as closure panels for an interior of the vehicle 10. Each door assembly 20 is slidingly, pivotally, or otherwise connected to the body 12 of the vehicle 10 such that the door assembly 20 is capable of moving between a closed position and an open position. In particular, a rear passenger door assembly 22 may be a slidingly connected to the body 12 of the vehicle 10, such as is found on many passenger vans. It is noted that while the remaining description will focus on latch assemblies 100 as part of a sliding rear passenger door assembly 22, similar latch assemblies may be applicable to swinging or hingedly coupled passenger and driver doors.

The rear passenger door assembly 22 is constructed from rigidly interconnected door frame members and door panels, as well as any combination of overlying paneling, trim, upholstery and other door coverings. The door panels include an upright inner door panel and an upright outer door panel 32. In some embodiments, there may be additional outer and/or inner door panels. The inner door panel and the outer door panel 32 are spaced apart from one another in the vehicle lateral direction. As a result, the rear passenger door assembly 22 has an interior door cavity 34 defined between the inner door panel and the outer door panel 32.

Figure 2:
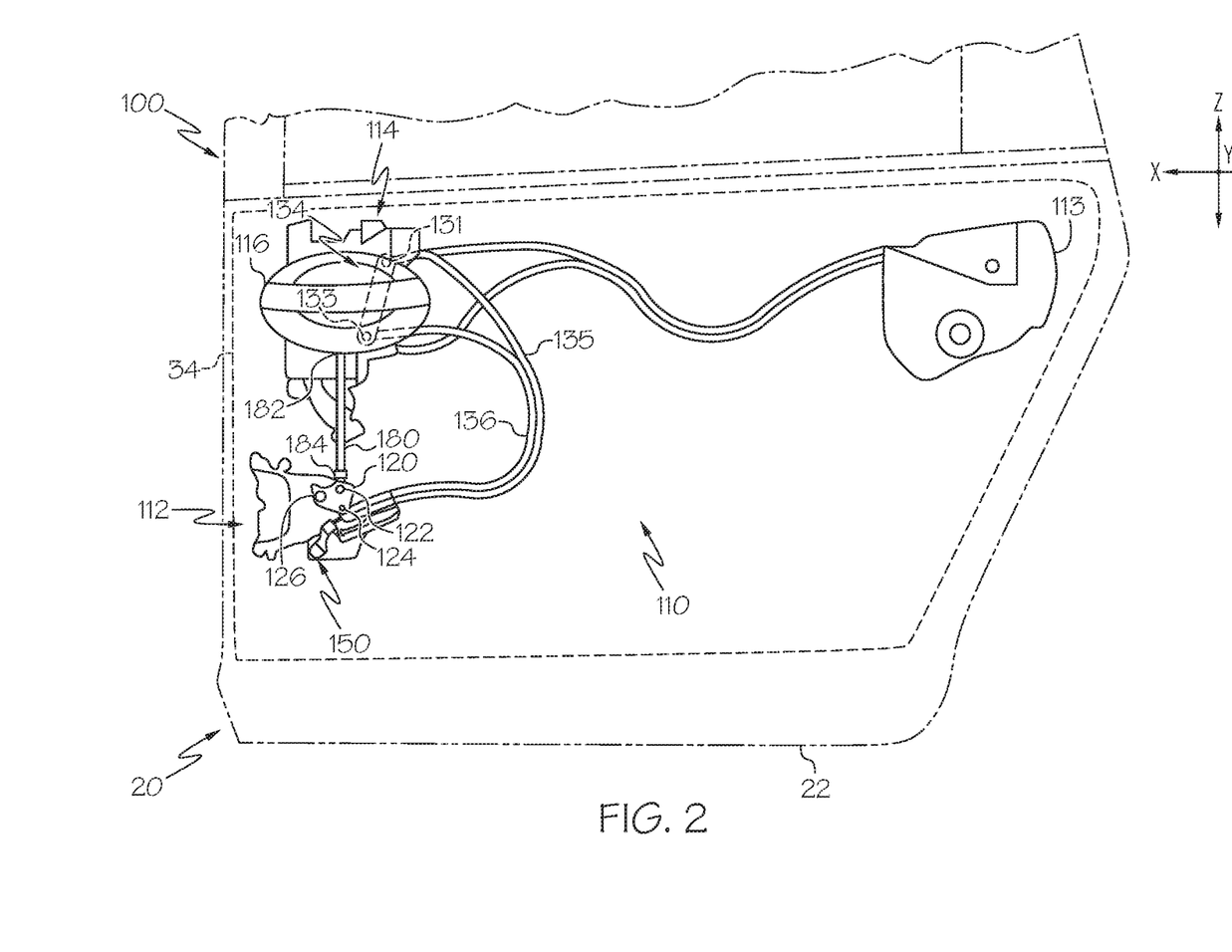
FIG. 2 depicts a door assembly of the vehicle of FIG. 1 with a door latch assembly, according to one or more embodiments shown and described herein.

The interior door cavity 34 can house various components of the rear passenger door assembly 22. In particular, the interior door cavity 34 houses a portion of the door latch assembly 100 schematically illustrated by dashed lines in FIG. 1. Referring also to FIG. 2, which further illustrates the door latch assembly 100, the door latch assembly 100 operates to close, lock, unlock and open the rear passenger door assembly 22. The door latch assembly 100 includes one or more latching mechanisms operable to latch the rear passenger door assembly 22 to the body 12 of the vehicle 10, a door handle assembly 114 that is operatively coupled to the one or more latching mechanisms, and a linking system 110 which operatively couples the door handle assembly 114 to the one or more latching mechanisms such that rotation of a handle (e.g., exterior door handle 116) of the door handle assembly 114 causes the one or more latching mechanisms to unlatch the rear passenger door assembly 22.

Each of the one or more latching mechanisms may be rigidly mounted within the interior door cavity 34. In one embodiment, the door latch assembly 100 includes a front latching mechanism 112, positioned toward a front portion of the rear passenger door assembly 22 in the vehicle longitudinal direction, and a rear latching mechanism 113, positioned toward a rear portion of the rear passenger door assembly 22 in the vehicle longitudinal direction. For example, the front latching mechanism 112 may be positioned in a front lower quadrant of the rear passenger door assembly 22 and the rear latching mechanism 113 may be positioned in a rear upper quadrant of the rear passenger door assembly 22. However, it is contemplated that the front and rear latching mechanisms 112, 113 may be positioned anywhere within the rear passenger door assembly 22 that is suitable for latching the rear passenger door assembly in the closed position. The front and rear latching mechanisms 112, 113 are operable to move a latch from a latched position where it is coupled to the body 12 of the vehicle 10, wherein the rear passenger door assembly 22 is unable to move relative to the body 12 of the vehicle 10, to an unlatched position, wherein the rear passenger door assembly 22 is free to move relative to the body 12 of the vehicle 10.

Figure 3:
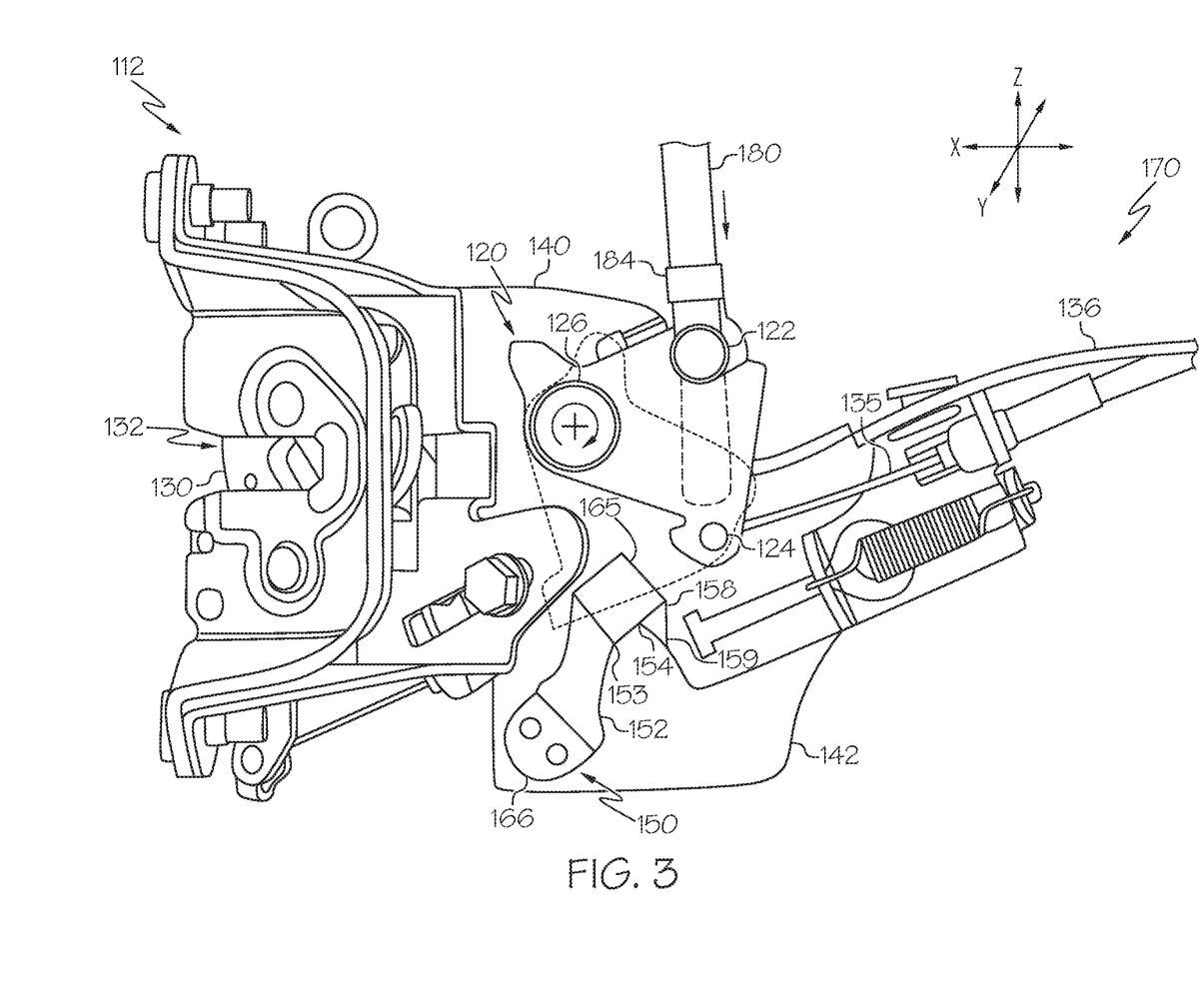
FIG. 3 depicts a front latching mechanism of the door latch assembly of FIG. 2 with a bell crank blocking structure, according to one or more embodiments shown and described herein.

FIG. 3 provides a more detailed illustration of the front latching mechanism 112. The front latching mechanism 112 includes a bell crank 120 having a plane of rotation lying in the X-Z directions, a latch 130 operatively coupled to the bell crank 120 such that rotation of the bell crank 120 in the plane of rotation causes the latch 130 to latch or unlatch, and a support structure 140 that supports rotation of the bell crank 120.

As noted above, the front latching mechanism 112 includes the bell crank 120. A bell crank 120 is a type of lever that is configured to change an angle of motion through the linking system 110. For example, the bell crank 120 includes a first moveable pivot point 122, a second movable point 124, and a fixed pivot point 126. The first moveable pivot point 122 and the second moveable pivot point 124 are angled from on another relative to the fixed pivot point 126. As will be explained with reference to the linking system 110, force applied through the linking system 110 when a door handle of the door handle assembly 114 is actuated, can be redirected using the bell crank 120 as it rotates through its plane of rotation, illustrated by dashed lines in FIG. 3, to move the latch 130 to the unlatched position.

The bell crank 120 is pivotally coupled to the support structure 140 at the fixed pivot point 126. The support structure 140 may be any structure (e.g., bracket, back plate, or the like) suitable for supporting rotation of the bell crank 120 around the fixed pivot point 126. The support structure 140 may extend past the bell crank 120 in the vehicle vertical direction so as to have an extended support portion 142. For example, in FIG. 3, the support structure 140 is illustrated as extending to a position below the bell crank 120 in the vehicle vertical direction. As will be described in greater detail herein, by extending the support structure 140 below the bell crank 120, the extended support portion 142 may be used for mounting a bell crank blocking structure 150 proximate to the bell crank 120. In other embodiments, it is contemplated that the bell crank blocking structure 150 can be mounted elsewhere other than below the bell crank 120. In some embodiments, the bell crank blocking structure 150 may have a separate support structure 140.

Referring now to the latch 130, the latch 130 is operatively coupled to the bell crank 120 through the linking system 110. The latch 130 has a latching position in which the rear passenger door assembly 22 is fixed relative to the body 12 of the vehicle 10 and an unlatching position wherein the rear passenger door assembly 22 is able to move relative to the body 12 of the vehicle 10. The front latching mechanism 112 supports latch 130 at the periphery of the rear passenger door assembly 22, for movement relative to the rear passenger door assembly 22 between the latching position and the unlatching position. For example, the front latching mechanism 112 defines a striker chute 132, and the latch 130 can be structured as a rotor. The surrounding body 12 of the vehicle 10 includes a striker for the latch 130 to engage. The striker chute 132 is configured to selectively receive the striker, and the latch 130 is configured to selectively engage the striker. The front latching mechanism 112 supports the latch 130, in the striker chute 132, for pivotation between the latching positions and the unlatching positions.

As an example, as the rear passenger door assembly 22 is moved from the open position to the closed position, the striker for the front latching mechanism 112 enters the striker chute 132, and the latch 130 contacts the striker. This contact triggers actuation of the latch 130 to pivot, around the striker, from the unlatching position to the latching position. In the latching position, the latch 130 engages the striker therefore to capture the striker in the striker chute 132. The latch 130 is thereby latched to the surrounding body 12 to which the striker belongs. The latch 130 can be actuated, on the other hand, via return actuation, pivoting from around the striker to the unlatching position. In the unlatching position, the latch 130 disengages from the striker therefore to release the striker from the striker chute 132, thereby unlatching the rear passenger door assembly 22. It is noted that the rear latching mechanism 113 may have a similar latch construction as described herein in regards to the front latching mechanism 112.

Referring back to FIG. 2, the linking system 110 operatively couples the door handle assembly 114 to the one or more latching mechanisms so as to allow a user to unlatch the vehicle door assembly 20 by operating a door handle of the door handle assembly 114. With particular focus on the front latching mechanism 112, the linking system 110 includes a lock rod 180 operatively coupled to a handle (e.g., the exterior door handle 116) of the door handle assembly 114 at a first end 182 and coupled to the first moveable pivot point 122 of the bell crank 120 at a second end 184. That is, the lock rod 180 extends in the vehicle vertical direction between the door handle assembly 114 and the front latching mechanism 112.

The linking system 110 further includes a lever 134 located within the door handle assembly 114, a first cable 135, and a second cable 136. The first cable 135 extends from a first end 131 of the lever 134 to the second moveable pivot point 124 of the bell crank 120. The second cable 136 extends from a second end 133 of the lever 134 and is operatively coupled to the latch 130. In operation under normal operating conditions, a handle of the door handle assembly 114 is actuated by a user. The door handle is operatively coupled to the lock rod 180 such that actuation of the handle of the door handle assembly 114 causes the lock rod 180 to be pushed in the vehicle vertical direction toward the front latching mechanism 112. The vertical movement of the lock rod 180 causes the bell crank 120 to rotate about its fixed pivot point 126 through its plane of rotation. The rotation of the bell crank 120 through its plane of rotation causes first cable 135 to be pulled in the direction of rotation of the bell crank 120 due to its coupling to the second moveable pivot point 124 of the bell crank 120. The movement of the first cable 135 causes the lever 134 to rotate which in turn, causes the second cable 136 to be pulled. The pulling of the second cable 136 actuates the latch 130 from the latched position to the unlatched position.

Referring to FIG. 3, the bell crank blocking structure 150 is mounted to the support structure 140 of the front latching mechanism 112. In particular the bell crank blocking structure 150 is mounted to an extended support portion 142 at a position beneath the bell crank 120 in the vehicle vertical direction. However, as noted above, the bell crank blocking structure 150 may be mounted anywhere within the rear passenger door assembly 22 so long as it is able to deform into the plane of rotation of the bell crank 120 and block rotation of the bell crank 120. In some embodiments, the bell crank blocking structure 150 includes a first leg 152 that extends outwardly in the vehicle lateral direction from the extended support portion 142 of the support structure 140 to an overhang portion 154. The overhang portion 154 is connected to the first leg 152 at a bend 153 so as to extend over at least a portion of the plane of rotation of the bell crank 120. In some embodiments, a second leg 158 is connected to the overhang portion 154 by a bend 165 such that the second leg 158 extends toward the support structure 140 to a free end 159. The overhang portion 154 spaces the second leg 158 from the plane of rotation of the bell crank 120 during normal vehicle operating conditions.

Figure 4:
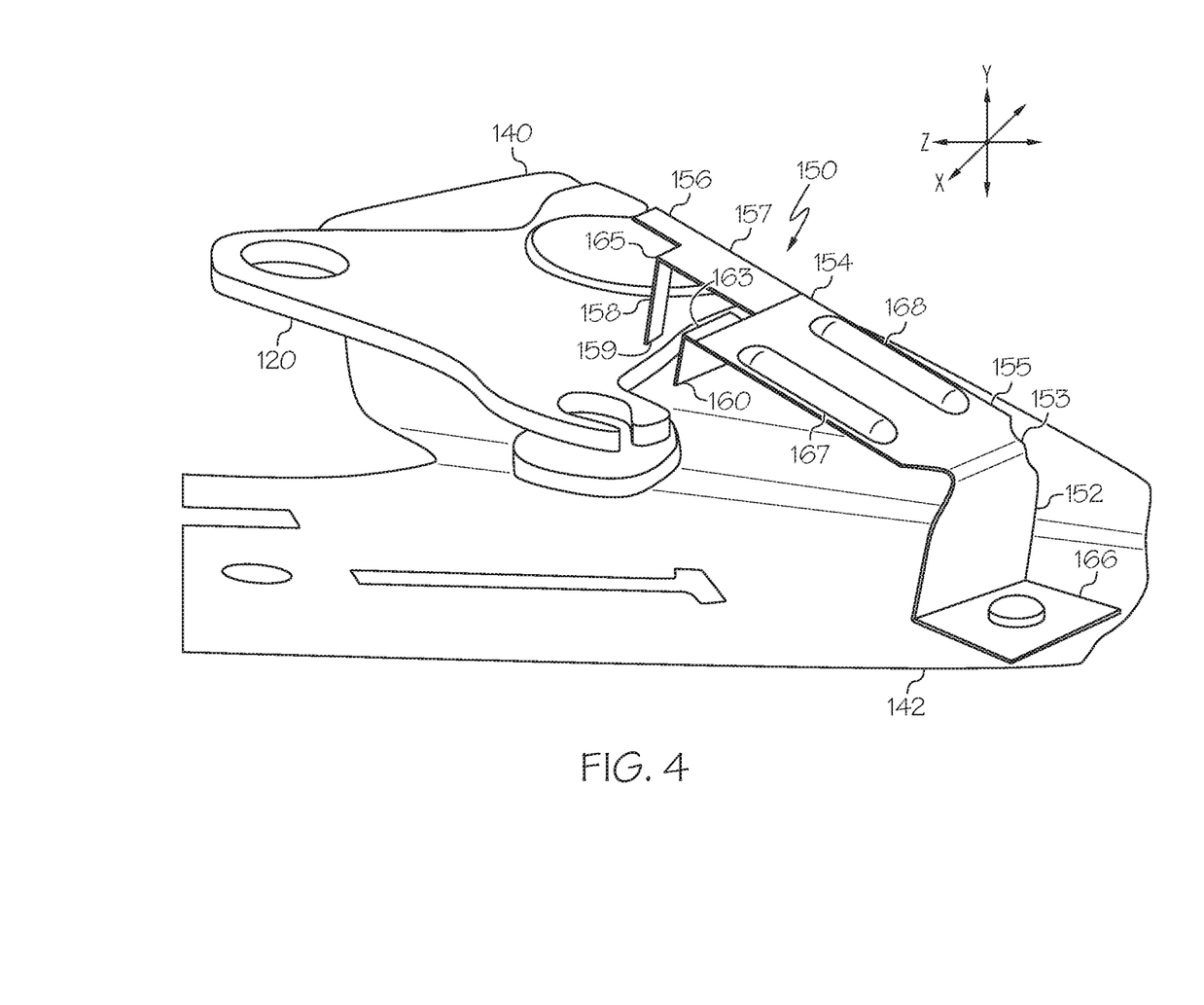
FIG. 4 depicts a perspective view of a bell crank blocking structure positioned relative to a bell crank, according to one or more embodiments shown and described herein.

FIG. 4 illustrates a more detailed view of the bell crank blocking structure 150 according to one or more embodiments. In particular, FIG. 4 illustrates a perspective view of the bell crank 120, the support structure 140, and the bell crank blocking structure 150 in isolation from the remainder of the rear passenger door assembly 22. The bell crank blocking structure 150 may be connected to the extended support portion 142 of the support structure 140 at the first leg 152. For example, the first leg 152 may include a foot 166 that is fastened or otherwise coupled to the support portion 142 of the support structure 140 forming a cantilevered support for the bell crank blocking structure 150. The first leg 152 and the foot 166 may be spaced from the plane of rotation of the bell crank 120 in the vehicle vertical direction, while the second leg 158 and the free end 159 may be located over the plane of rotation of the bell crank 120 in the vehicle lateral direction. The free end 159 of the second leg 158 is spaced from the support structure 140 in the vehicle lateral direction such that the bell crank 120 can pass through its plane of rotation without obstruction during normal operation (see also FIG. 5).

In some embodiments, the second leg 158 and the first leg 152 have different widths. For example, as shown in FIG. 4, the second leg 158 has a narrower width than the first leg 152. In some embodiments, the second leg 158 and the first leg 152 have the same width. In some embodiments, the second leg 158 and the first leg 152 may be of similar lengths. In some embodiments the first leg 152 and the second leg 158 may have different lengths. For example, as shown in FIG. 5, the first leg 152 may be shorter than the second leg 158.

It is noted, with reference to FIG. 4, in some embodiments, the overhang portion 154 may include one or more reinforcement grooves 167, 168 that strengthen the overhang portion 154 for impact with the outer door panel 32 or other structures within the rear passenger door assembly 22. In some embodiments, the overhang portion 154 includes a retention tab 156 that extends beyond the second leg 158 in the vehicle vertical direction over the plane of rotation of the bell crank 120. As will be described in greater detail herein, the retention tab 156 may be configured to extend over the bell crank 120 in the vehicle lateral direction during certain side impact conditions. By extending over the bell crank 120, bell crank 120 will be blocked from rotating over the overhang portion 154 of the bell crank blocking structure 150 (e.g., see FIG. 6). In some embodiments, the bell crank blocking structure 150 does not have a retention tab 156 such as illustrated in FIG. 3.

In some embodiments, the bell crank blocking structure 150 includes an intermediate leg 160 located between the first leg 152 and the second leg 158. The intermediate leg 160 may also be laterally spaced from the plane of rotation by the overhang portion 154 under normal operating conditions. In such embodiments, the overhang portion 154 may include a first portion 155 extending between the first leg 152 and the intermediate leg 160 and a second portion 157 that extends from the intermediate leg 160 to the second leg 158. The intermediate leg 160 may be connected to the first portion 155 of the overhang portion 154 at a bend 163. The second leg 158 and the intermediate leg 160 may be generally parallel to one another. However other, non-parallel, orientations are also contemplated. In some embodiments the intermediate leg 160 may be shorter than the second leg 158. In other embodiments, the second leg 158 and the intermediate leg 160 may have the same length. In some embodiments, the first, second, and intermediate legs can have dissimilar widths. For example, the intermediate leg 160 may have a greater width than the second leg 158 and a smaller width than the first leg 152. In other embodiments, any of the first, second, and intermediate legs may have similar widths. The intermediate leg 160 may serve as an additional blocking structure for blocking rotation of the bell crank 120 during certain side impact conditions. In some embodiments, there may be no intermediate leg 160 such as illustrated in FIGS. 5 and 6.

Figure 5:
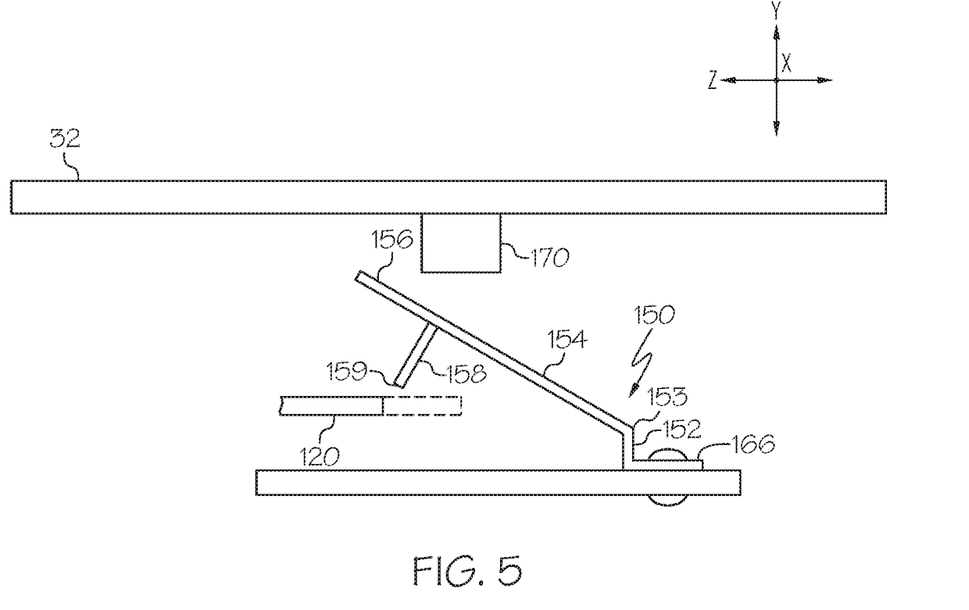
FIG. 5 depicts a free end of a bell crank blocking structure of spaced outside of a plane of rotation of the bell crank, according to one or more embodiments shown and described herein.
Figure 6:
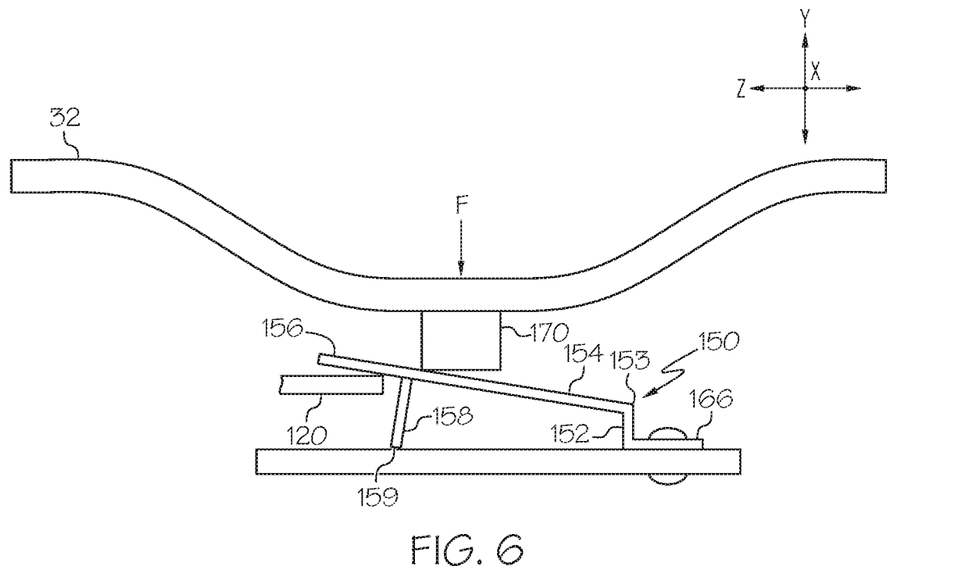
FIG. 6 depicts the bell crank blocking structure of FIG. 5 pushed into the plane of rotation of the bell crank during a side impact condition, according to one or more embodiments shown and described herein.

FIG. 5 illustrates a portion of the rear passenger door assembly 22 under normal operating conditions. That is, the bell crank blocking structure 150 is positioned such that the second leg 158 is spaced from the plane of rotation of the bell crank 120 in the vehicle lateral direction. As noted herein, when the bell crank blocking structure 150 is positioned such that the second leg 158 is spaced from the plane of rotation of the bell crank 120, the bell crank 120 can travel through its plane of rotation, illustrated by dashed lines, to unlatch the rear passenger door assembly 22 as discussed above. As illustrated, under normal vehicle operating conditions, the overhang portion 154 of the bell crank blocking structure 150 is located adjacent to the outer door panel and the outer door panel 32, or an intervening outer door panel, is spaced apart from overhang portion 154 of the bell crank blocking structure 150.

In some embodiments, a pusher member 170, (e.g., impact beam, bar, block, or the like) can be coupled to the outer door panel 32 between the overhang portion 154 of the bell crank blocking structure 150 and the outer door panel 32. During certain side impact conditions, the outer door panel 32 and pusher block can deform toward the bell crank blocking structure 150 such that the pusher member 170 contacts the overhang portion 154 of the bell crank blocking structure 150. Such contact can cause the second leg 158 of the bell crank blocking structure 150 to enter the plane of rotation of the bell crank 120. In some embodiments, there is no pusher block. Instead, the outer door panel 32 itself may contact the overhang portion 154 during certain side impact conditions to cause the second leg 158 of the bell crank blocking structure 150 to deform into the plane of rotation of the bell crank 120.

When a vehicle (e.g., vehicle 10) experiences an impact, vehicle structures may elastically and plastically deform while the vehicle slows from its previous operating speed. The impact diverts the energy associated with a moving vehicle into energy that deforms vehicle structures. The vehicle structures may be designed to accommodate such impact events, such that the energy associated with the impact may be controllably dissipated through selective and preferential deformation of the vehicle structures.

When a vehicle experiences a side impact, energy may be received in the areas of the rear passenger door assembly 22 as represented by arrow F. As the door structures move inward in the vehicle lateral direction, they may impinge upon the door latch assembly 100. In order to inhibit unintended movement of the bell crank 120 during such movement of the vehicle door structures, the bell crank blocking structure 150 is provided.

Referring to FIG. 6, the outer door panel 32 is illustrated moving inwardly in the vehicle lateral direction due to application of a force F. As the outer door panel 32 moves, the outer door panel 32 or a pusher member 170, as illustrated, can engage the overhang portion 154 of the bell crank blocking structure 150. The outer door panel 32 may continue to move, which can cause the overhang portion 154 to move toward the plane of rotation of the bell crank 120 and toward the support structure 140. For example, the overhang portion 154 may pivot around an axis defined by bend 153 when the overhang portion 154 is contacted by the outer door panel 32 or pusher member 170 due to the cantilevered arrangement. As the overhang portion 154 bends, the second leg 158 and the free end 159 move in the vehicle lateral direction toward the support structure 140 and into the plane of rotation of the bell crank 120. In some embodiments, the first leg 152 may bend away from the attachment between the foot 166 and the support structure 140. The bending of the first leg 152 causes the second leg 158 and the free end 159 to move in the vehicle lateral direction toward the support structure 140 and into the plane of rotation of the bell crank 120. When the second leg 158 enters the blocking orientation, the second leg 158 inhibits movement of the bell crank 120 through its plane of rotation to allow the rear passenger door assembly 22 to become unlatched. As noted above, when the second leg 158 moves into the blocking orientation, the retention tab 156 may extend over the bell crank 120 and block the bell crank 120 from rotating over the bell crank blocking structure 150.

The bell crank blocking structure 150 can be formed of any suitable material, such as metal, that allows for deformation of the bell crank blocking structure 150 as described above. Further, other shapes for the bell crank blocking structure 150 may be used other than that illustrated, such as a rounded shape, irregular shape, etc.

Figure 7:
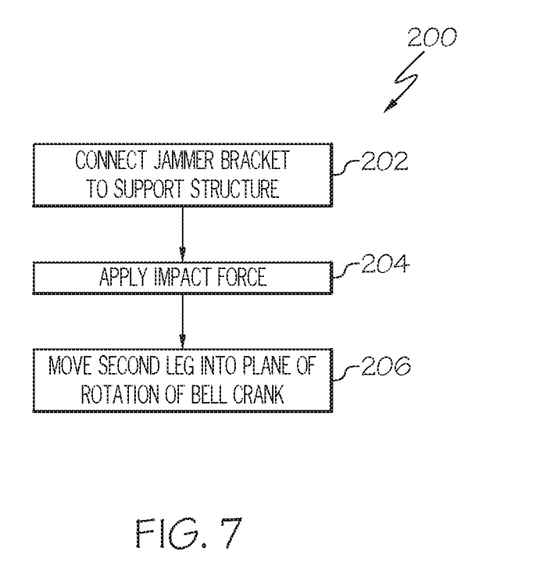
FIG. 7 depicts a method of inhibiting movement of a door latch assembly of a vehicle from a latched configuration to an unlatched configuration, according to one or more embodiments shown and described herein.

Referring to FIG. 7, a method 200 of inhibiting movement of the door latch assembly 100 from a latched configuration that latches the vehicle door assembly 20 (e.g., the rear passenger door assembly 22) in a closed configuration to an unlatched configuration that allows for opening of the vehicle door assembly 20 is illustrated. At step 202, the bell crank blocking structure 150 is provided and is connected to the support structure 140 such that the first leg 152 extends toward the outer panel and away from the support structure 140 and the second leg 158 extends away from the outer door panel 32 and toward the support structure 140 to the free end 159 that is spaced from the plane of rotation of the bell crank 120. At step 204, a side impact force is applied to the vehicle door assembly 20 that causes the vehicle door structures to move inward including the outer door panel 32. At step 206, as the outer door panel 32 moves inward in the vehicle lateral direction, the outer door panel 32 or a pusher member 170 engages the bell crank blocking structure 150 thereby moving the free end 159 of the second leg 158 toward the support structure 140 and into the plane of rotation of the bell crank 120, thereby inhibiting movement of the door latch assembly 100 from the latched configuration to the unlatched configuration during the side impact.

The above-described vehicle door assemblies include door latch assemblies that provide bell crank blocking structures that can be used to inhibit unintended unlatching of the vehicle door assemblies during a side impact. The bell crank blocking structures are mounted at one leg to a support structure and extend to a free end at an opposite second leg that is spaced from a plane of rotation of the bell crank. During normal operating conditions, the bell crank can travel through its plane of rotation past the free end of the second leg of the bell crank blocking structure to place the door latch assembly in latched and unlatched configurations. During a side impact condition, the bell crank blocking structures are located to deform with movement of vehicle door structures to enter to plane of rotation of the bell crank thereby blocking the travel path of the bell crank.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a body; and
a vehicle door assembly movably coupled to the body, wherein the vehicle door assembly comprises:
an outer door panel; and
a door latch assembly positioned inboard of the outer door panel and operable to latch and unlatch the vehicle door assembly to the body, wherein the door latch assembly comprises:
a door handle assembly;
a bell crank operatively coupled to the door handle assembly, wherein rotation of the door handle assembly causes the door latch assembly to unlatch the vehicle door assembly; and
a bell crank blocking structure comprising:
a first leg extending from a support structure within the vehicle door assembly; and
an overhang portion connected to the first leg, the overhang portion extending outwardly from the first leg so as to be spaced from a plane of rotation of the bell crank, wherein the overhang portion is configured to deform toward the plane of rotation of the bell crank during a side impact condition to block rotation of the bell crank.

2. The vehicle of claim 1, further comprising a second leg extending from the overhang portion, wherein the overhang portion spaces the second leg from the plane of rotation of the bell crank.

3. The vehicle of claim 2, wherein the overhang portion comprises a retention tab that extends beyond the second leg in a vehicle longitudinal direction, wherein the retention tab is configured to extend over the bell crank in during the side impact condition.

4. The vehicle of claim 2, wherein the first leg is connected to the overhang portion at a bend and the second leg is connected to the overhang portion at a bend.

5. The vehicle of claim 2, wherein the overhang portion is located adjacent the outer door panel such that the outer door panel engages the overhang portion during a side impact that moves the outer door panel in a vehicle lateral direction thereby moving the overhang portion and the second leg toward the support structure.

6. The vehicle of claim 1, wherein the bell crank is rotatively coupled to the support structure.

7. The vehicle of claim 1, wherein the bell crank blocking structure is mounted below the bell crank in a vehicle vertical direction.

8. The vehicle of claim 1, wherein the support structure extends below the bell crank in a vehicle vertical direction and the bell crank blocking structure is mounted to the support structure below the bell crank in the vehicle vertical direction.

9. A vehicle door assembly comprising:
an outer door panel; and
a door latch assembly positioned inboard of the outer door panel and operable to latch and unlatch the vehicle door assembly, wherein the door latch assembly comprises:
a door handle assembly;
a bell crank operatively coupled to the door handle assembly, wherein rotation of the bell crank causes the door latch assembly to unlatch the vehicle door assembly; and
a bell crank blocking structure comprising:
a first leg extending from a support structure within the vehicle door assembly; and
an overhang portion connected to the first leg, the overhang portion extending from the first leg so as to be spaced from a plane of rotation of the bell crank, wherein the overhang portion is configured to deform toward the plane of rotation of the bell crank during a side impact condition to block rotation of the bell crank.

10. The vehicle door assembly of claim 9, further comprising a second leg extending from the overhang portion, wherein the overhang portion spaces the second leg from the plane of rotation of the bell crank.

11. The vehicle door assembly of claim 10, wherein the overhang portion comprises a retention tab that extends beyond the second leg in a vehicle longitudinal direction, wherein the retention tab is configured to extend over the bell crank during the side impact condition.

12. The vehicle door assembly of claim 10, wherein the first leg is connected to the overhang portion at a bend and the second leg is connected to the overhang portion at a bend.

13. The vehicle door assembly of claim 10, wherein the overhang portion is located adjacent the outer door panel such that the outer door panel engages the overhang portion during a side impact that moves the outer door panel in a vehicle lateral direction thereby moving the overhang portion and the second leg toward the support structure.

14. The vehicle door assembly of claim 9, wherein the bell crank is rotatively coupled to the support structure.

15. The vehicle door assembly of claim 9, wherein the bell crank blocking structure is mounted below the bell crank in a vehicle vertical direction.

16. The vehicle door assembly of claim 9, wherein the support structure extends below the bell crank in a vehicle vertical direction and the bell crank blocking structure is mounted to the support structure below the bell crank in the vehicle vertical direction.

17. A method of inhibiting movement of a door latch assembly of a vehicle from a latched configuration to an unlatched configuration, the method comprising:
providing a first leg of a bell crank blocking structure to extending from a support structure located within an interior of a vehicle door assembly, wherein:
the vehicle door assembly comprises:
an outer door panel; and
a door latch assembly positioned inboard of the outer door panel and operable to latch and unlatch the vehicle door assembly, wherein the door latch assembly comprises:
a door handle assembly; and
a bell crank operatively coupled to the door handle assembly, wherein rotation of the bell crank causes the door latch assembly to unlatch the vehicle door assembly; and
the bell crank blocking structure comprises an overhang portion connected to the first leg and extending from the first leg; and
locating the bell crank blocking structure so as to be spaced from a plane of rotation of the bell crank, wherein the overhang portion is configured to deform toward the plane of rotation of the bell crank during a side impact condition to block rotation of the bell crank.

18. The method of claim 17, wherein the bell crank blocking structure further comprise a second leg coupled to the overhang portion, wherein the overhang portion spaces the second leg from the plane of rotation of the bell crank.

19. The method of claim 18, further comprising moving the second leg of the bell crank blocking structure into the plane of rotation of the bell crank to block the bell crank from rotating through the plane of rotation.

20. The method of claim 18, wherein the overhang portion comprises a retention tab that extends beyond the second leg in a vehicle longitudinal direction, wherein the retention tab is configured to extend over the bell crank during the side impact condition.

* * * * *